(12) United States Patent
Madey et al.

(10) Patent No.: US 6,636,534 B2
(45) Date of Patent: Oct. 21, 2003

(54) PHASE DISPLACEMENT FREE-ELECTRON LASER

(75) Inventors: John M. J. Madey, Honolulu, HI (US); Eric Brent Szarmes, Honolulu, HI (US); Orion Crissafulli, Kailua, HI (US)

(73) Assignee: University of Hawaii, Honolulu, HI (US)

( * ) Notice: Subject to any disclaimer, the term of this patent is extended or adjusted under 35 U.S.C. 154(b) by 0 days.

(21) Appl. No.: 10/081,577

(22) Filed: Feb. 22, 2002

(65) Prior Publication Data
US 2002/0191650 A1 Dec. 19, 2002

Related U.S. Application Data

(60) Provisional application No. 60/271,872, filed on Feb. 26, 2001, and provisional application No. 60/271,873, filed on Feb. 26, 2001.

(51) Int. Cl.[7] .................................................. H01S 3/00
(52) U.S. Cl. ....................................................... 372/2
(58) Field of Search ......................... 372/2; 315/3–5, 315/5.13, 5.14

(56) References Cited

U.S. PATENT DOCUMENTS

| | | | | |
|---|---|---|---|---|
| 4,461,004 A | * | 7/1984 | Madey | 372/2 |
| 5,130,994 A | * | 7/1992 | Madey et al. | 372/2 |
| 5,263,043 A | * | 11/1993 | Walsh | 372/102 |
| 5,410,558 A | * | 4/1995 | Hackett | 372/2 |
| 5,590,148 A | * | 12/1996 | Szarmes | 372/105 |
| 5,663,971 A | * | 9/1997 | Carlsten | 372/2 |
| 2002/0181535 A1 | * | 12/2002 | Szarmes | 372/92 |
| 2002/0191650 A1 | * | 12/2002 | Madey et al. | 372/2 |

\* cited by examiner

*Primary Examiner*—Leon Scott, Jr.
(74) *Attorney, Agent, or Firm*—Duane Morris LLP (57) ABSTRACT

A free-electron laser (FEL), which in a preferred embodiment comprises a relativistic electron beam generator; an optical cavity capable of storing a co-propagating optical beam; an interaction region; a phase displacement device disposed in the interaction region; and an output coupler interposed in the optical cavity through which a predetermined portion of the co-propagating optical beam exits as a coherent output optical beam. In certain embodiments, an optical beam spectral filter may be interposed in the optical cavity. FEL components and methods of use are also disclosed. It is emphasized that this abstract is provided to comply with the rules requiring an abstract which will allow a searcher or other reader to quickly ascertain the subject matter of the technical disclosure. It is submitted with the understanding that it will not be used to interpret or limit the scope of meaning of the claims.

17 Claims, 6 Drawing Sheets

PHASE DISPLACEMENT FREE-ELECTRON LASER

RELATED APPLICATIONS

The present invention claims priority from U.S. Provisional Application No. 60/271,872 filed Feb. 6, 2001 and U.S. Provisional Application No. 60/271,873 filed Feb. 6, 2001.

FIELD OF THE INVENTION

The present invention relates to free-electron lasers.

BACKGROUND OF THE INVENTION

The following references are cited in this background to better illustrate the background of the invention:

| | |
|---|---|
| Ref. 1 | U.S. Pat. No. 3,822,410 issued to Madey for "Stimulated Emission of Radiation in a Periodically Deflected Electron Beam"; |
| Ref. 2 | J. M. J. Madey, "Stimulated Emission of Bremsstrahlung in a Periodic Magnetic Field," J. Appl. Phys., vol. 42, pp. 1906–1913, 1971; |
| Ref. 3 | J. M. J. Madey, D. A. G. Deacon, L. R. Elias, and T. I. Smith, "An Approximate Technique for the Integration of the Equations of Motion in a Free-Electron Laser," Il Nuovo Cimento, vol. 51B, pp. 53–69, 1979; |
| Ref. 4 | W. B. Colson, Free Electron Laser Theory, Ph.D. Dissertation, Stanford, CA: Department of Physics, Stanford University, 1977; |
| Ref. 5 | N. M. Kroll, P. L. Morton, and M. N. Rosenbluth, "Free-Electron Lasers with Variable Parameter Wigglers," IEEE J. Quantum Electron., vol. QE-17, pp. 1436–1468, 1981; |
| Ref. 6 | ibid; |
| Ref. 7 | C. A. Brau, Free-Electron Lasers, Boston, MA: Academic Press, 1990; pp. 236–255; |
| Ref. 8 | op. cit., ref. 3; |
| Ref. 9 | op. cit., ref. 5; |
| Ref. 10 | op. cit., ref. 7; pp. 255–258; |
| Ref. 11 | O. K. Crisafulli, E. B. Szarmes, and J. M. J. Madey, "Use of Inverse-Tapering to Optimize Efficiency and Suppress Energy Spread in an rf-Linac Free-Electron Laser Oscillator," IEEE J. Quantum Electron., vol. 37, pp. 993–1007, 2001; |
| Ref. 12 | U.S. Pat. No. 4,641,103 issued to Madey et al. for "Microwave Electron Gun"; and |
| Ref. 13 | U.S. Pat. No. 5,130,994 issued to Madey et al. for "Free-electron laser oscillator for simultaneous narrow spectral resolution and fast-time resolution spectroscopy.". |

A free-electron laser is a device used to convert the kinetic energy of a beam of relativistic free electrons to electromagnetic radiation in the wavelength region between the mm-wave region in radio spectrum and the extreme ultraviolet region at optical wavelengths (Ref. 1). As is known in the art, free-electron lasers work by exploiting the interaction between a beam of relativistic electrons moving through a spatially oscillating transverse magnetic field and a co-propagating beam of electromagnetic radiation (Ref. 2).

In the presence of a strong optical field whose phase matches the phase of the transverse oscillations induced by the transverse magnetic field, the electrons' trajectories in phase and energy are governed by a pair of coupled equations which can be reduced to the pendulum equation (Ref. 3; Ref. 4). The existence of a series of fixed points and an associated set of stable, closed, periodic orbits ("buckets") in the phase space trajectories followed by the electrons in such a system has led to the development of a range of methods for enhancement of the power output that can be obtained from such devices (Ref. 5).

The principal method for enhancement of free-electron laser power output and efficiency employed to date has been the deceleration of the electrons circulating in the periodic orbits around the stable fixed points in their phase space trajectories by decreasing the period and/or amplitude of the spatially oscillating magnetic field as a function of position along the interaction region (Ref. 6; Ref. 7). This method has yielded only limited improvements in power output, and has the further disadvantage of failing to extract a significant amount of energy from the electrons moving along the open trajectories outside the region of phase stability, leaving the electrons emerging from the interaction distributed over a range of energies as large as 10% or more. Independent of the limited enhancement in power output attainable by this method, the large energy spread induced by this method has complicated attempts to recover the residual kinetic energy of the spent electrons, and made it impossible to operate more than one free-electron laser at a time using a single beam of electrons.

The expense of the accelerator systems required to produce the electron beams required for free-electron laser operation and the intense ionizing radiation produced by the spent electrons emerging from the interaction region if not decelerated have constituted major practical barriers to the further development and commercialization of free-electron lasers. The invention described herein overcomes these barriers by exploiting a different lasing mechanism, phase displacement (Ref. 8; Ref. 9; Ref. 10), in which the kinetic energy of electrons moving through an interaction region defined by a spatially oscillating transverse magnetic field and a co-propagating beam of electromagnetic radiation is converted to light by facilitating the deceleration of the electrons to lower energies along the open trajectories outside and between the regions of phase stability ("buckets"). By permitting deceleration of nearly all the electrons in the beam by nearly the same increment, this method provides greater laser power output than previously attainable by converting a greater fraction of the electrons average energy to electromagnetic radiation, while dramatically reducing the spread in energy induced by the interaction thereby simplifying the transport and recovery of the residual kinetic energy of the spent electron beam and reducing the risk of production of hazardous ionizing radiation during operation.

Accordingly, the invention described herein provides a means to enhance the power output, efficiency and flexibility of free-electron lasers while reducing their cost and complexity and the cost of the ancillary radiation shielding required to insure operator and public safety. These improvements are important to currently established and existing uses for free-electron lasers including laser surgery and diagnostics, materials processing, spectroscopy and remote sensing, laser power beaming, and high power laser weapons systems.

Although certain aspects of the phase displacement lasing mechanism were anticipated in the earlier publications, the inventors were the first to rigorously examine the operation of systems based on this mechanism under the conditions prevailing in practical use in which lasers must start from noise in the small signal regime, evolve naturally to achieve the conditions required for effective conversion of electron kinetic energy to light, and stably maintain these parameters for a useful interval of time (Ref. 11). In the course of this new and unanticipated investigation, the inventors were able to establish that such systems, properly designed, could start from noise and evolve naturally to a stable operating configuration compatible with enhanced power output and reduced output energy spread. However, the inventors have also discovered a new instability capable of disrupting laser operation outside a specific range of operating conditions, and have further established that this instability may be suppressed by limiting the growth of the spectral components of the optical field which mediate the instability.

BRIEF DESCRIPTION OF THE DRAWINGS

FIGS. 3a–3c are schematic views of possible arrangements of interaction regions and optical cavities;

DETAILED DESCRIPTION OF VARIOUS EXEMPLARY EMBODIMENTS

As used herein, the following terms have the following meanings:

| | |
|---|---|
| "magnetic field generator" | a device capable of creating a spatially oscillating transverse magnetic field of predetermined period and amplitude, both of which may vary with position along an axis of the magnetic field generator. The magnetic field generator may be interposed in the path of the electron beam generated by an electron beam generator whereby exchange of energy between the electron beam and a co-propagating optical beam is facilitated by interaction between the transverse electron velocity and the transverse optical electric field. By way of example and not limitation, a magnetic field generator may be a wiggler or undulator as these terms are understood by those of ordinary skill in the FEL arts. |
| "interaction region" | a region, possibly in a vacuum, disposed longitudinally along the direction of the electron beam in which the co-propagating electron and optical beams are overlapped with a field generated by the magnetic field generator and/or a phase displacement device. In some embodiments, there may be one or several distinct interaction regions disposed along the electron beam, or one or several distinct interaction regions disposed within an optical cavity. |
| "separatrix" | a closed trajectory in electron longitudinal phase space (where phase space coordinates are defined by the energy and longitudinal position of an electron in the electron beam) which separates open-orbit electron trajectories from closed-orbit electron trajectories in phase space. Separatrices are determined by the magnitude and spatial dependence of the magnetic field generated by the magnetic field generator together with the electric field of the co-propagating optical beam, independently of the electron beam. |
| "resonant energy" | the energy of the stable points in electron longitudinal phase space. |
| "synchrotron frequency" | the frequency at which electrons, located on closed-orbit trajectories about the stable points within the separatrices, undergo successive revolutions in phase space. |
| "phase displacement device" | a device that is capable of increasing resonant energy relative to the energy of an electron in the electron beam during the interaction of the electron with the optical beam in the interaction region. In some embodiments, the phase displacement device could be incorporated in the structure of the magnetic field generator. In other embodiments, the phase displacement device could be a device which is distinct from the magnetic field generator. |
| "small-signal regime" | refers to laser oscillation and is the period of time after initial generation of the laser beam when the stable fractional increase of laser power after each complete round trip in the optical cavity is substantially constant over successive round trips. By way of example and not limitation, the small-signal regime is characterized by electron energy perturbations which are substantially smaller than the height of the phase space separatrices. |
| "small-signal gain" | the fractional increase of laser power after a single pass through the interaction region in the small-signal regime. |
| "saturated regime" | refers to laser oscillation and is the state of dynamic equilibrium, established following the initial growth of the intensity of the optical field, in which the stable fractional increase of laser power after each complete round trip in the optical cavity has decreased to substantially negligible proportions compared to the fractional increase of laser power in the small-signal regime. By way of example and not limitation, the saturated regime is characterized by electron energy perturbations which are a substantial fraction of the height of the phase space separatrices. |
| "saturated gain" | the fractional increase of laser power after a single pass through the interaction region in the saturated regime. |

In the figures, a general reference to a device or element is indicated by a numeral, e.g. "X" and two or more specific instances of the device or element is indicated by a trailing letter, e.g. "Xa." By way of example, as used herein, an optical cavity is generally referred to by the numeral "30" while two or more optical cavities will be referred to individually as "30a," "30b," and the like.

Figure 1:
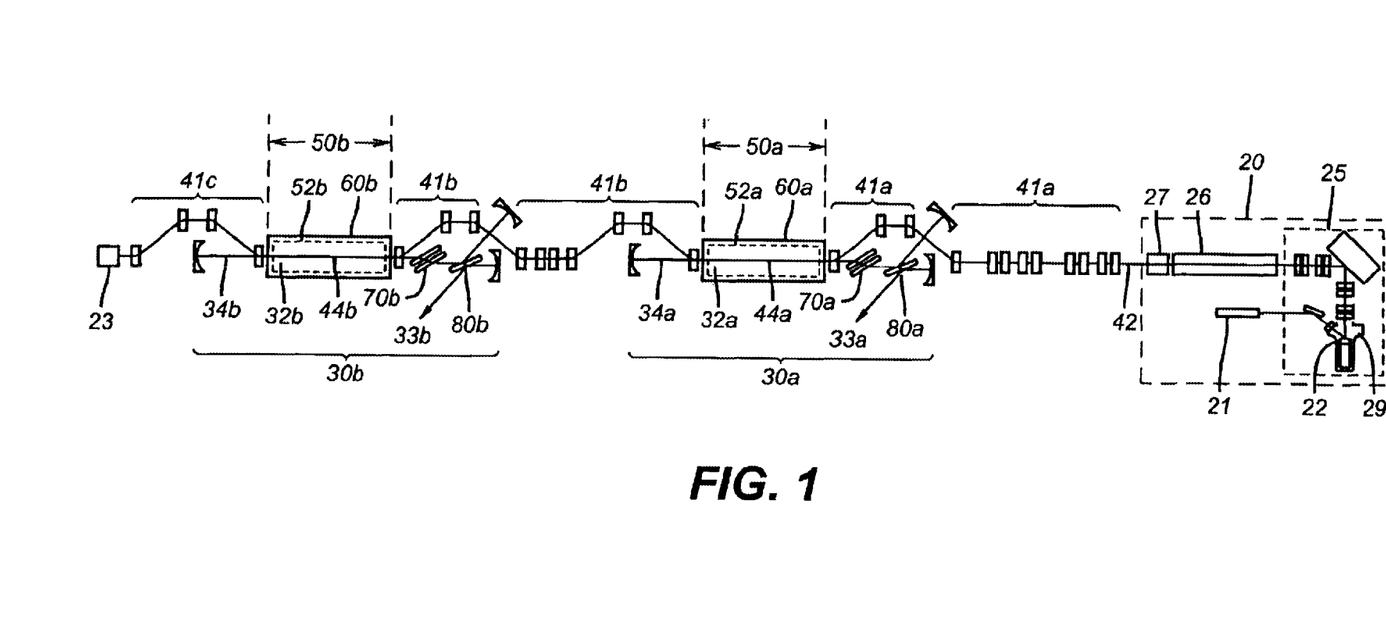
FIG. 1 is a schematic view of a free-electron laser of the present invention.

Referring now to FIG. 1, a free-electron laser of the present invention, generally referred to herein by the numeral "10" or by "FEL 10," comprises relativistic electron beam generator 20 which may be disposed at least partially within optional housing 12 (not shown in the figures) and which may further include subharmonic energy modulation cavity 27; electron beam transport system, generally referred to herein by the numeral "41;" optical cavity 30 which is capable of storing co-propagating optical beam 32; interaction region 50 disposed in optical cavity 30; phase displacement device 60 disposed about a predetermined portion of interaction region 50; optical beam spectral filter 70 interposed in optical cavity 30 along a predetermined portion of optical axis 34; and output coupler 80 interposed in optical cavity 30. A predetermined portion of co-propagating optical beam 32 exits optical cavity 30 via output coupler 80 to produce coherent output optical beam 33.

In certain contemplated embodiments, FEL 10 further comprises housing 12 (not shown in the figures) capable of maintaining a vacuum. In a preferred embodiment, the vacuum will be sustained at a pressure of at most $10^{-6}$ Torr. In certain currently considered embodiments, housing 12 may be substantially permanently sealed once the desired vacuum is achieved or may further comprise vacuum port 14 (not shown in the figures) to be connected to an external vacuum device (not shown in the figures). Additionally, one or more components, e.g. relativistic electron beam generator 20 and/or optical cavity 30, may be partially disposed within housing 12.

Relativistic electron beam generator 20 further comprises cathode 22 and accelerator 26. Relativistic electron beam generator 20 is capable of producing relativistic electron beam 42 by accelerating electrons emitted from cathode 22 through a DC potential gradient, one or more microwave accelerating cavities, a microwave linear accelerator, a linear induction accelerator, a circular induction accelerator, or the like, or a combination thereof, as these terms are understood by those of ordinary skill in the FEL arts. In a preferred embodiment, axis 44 of relativistic electron beam 42, generated at least in part by relativistic electron beam generator 20, is aligned along optical axis 34 of optical cavity 30.

Cathode 22 may comprise a thermionic cathode, a photoemissive cathode, a field-effect cathode, or the like, or a combination thereof. In certain embodiments, cathode 22 is capable of photo-assisted emission, by way of example and not limitation including photo-assisted field-emission, photo-assisted thermionic emission, or the like, or a combination thereof.

Ultraviolet laser 21 may be disposed proximate and illuminate cathode 22, enhancing current density emitted by cathode 22.

Relativistic electron beam generator 20 may further comprise microwave electron gun 25 and accelerator 26.

Accelerator 26 may comprise a microwave linear accelerator (microwave linac) operating at a predetermined frequency. In embodiments using a microwave linac, relativistic electron beam generator 20 may further comprise electron energy modulator 27 capable of modulating electron energy at a sub-harmonic of the operating frequency of the microwave linac.

Figure 2:
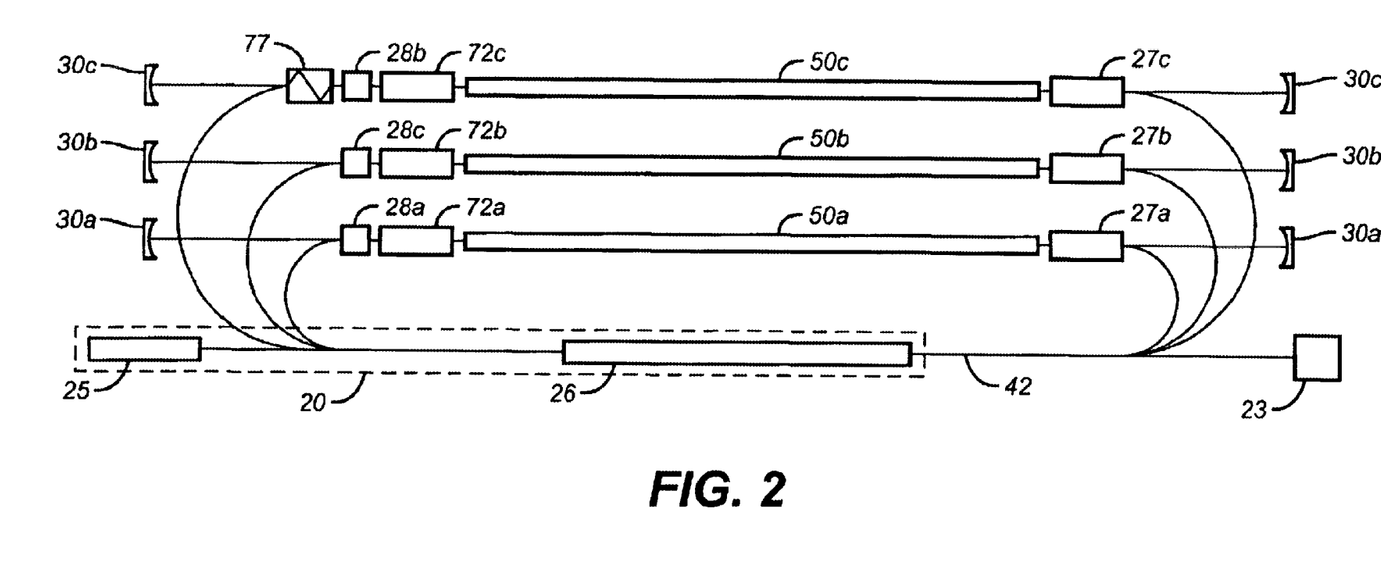
FIG. 2 is a schematic view of a microtron configuration of a multicolor phase displacement FEL.

Referring now to FIG. 2, relativistic electron beam 42 produced by relativistic electron beam generator 20 may be recirculated through microwave linear accelerator 26 in a microtron configuration, as that term will be familiar to those of ordinary skill in the FEL arts, where optical cavities 30$a$,30$b$,30$c$ enclose independent interaction regions 50$a$, 50$b$,50$c$ within a plurality of straight sections of the microtron. Subharmonic energy modulator cavities 27 and de-modulator cavities 72 may be used to shift the energy of alternate electron bunches passing through the interaction regions 50. Boost microwave cavities 28 may be used to replace the electron energy converted to light prior to re-injection of the recirculating electron beam into accelerator 26. Orbit length adjuster 77 may be used to adjust the phase at which the spent electrons are injected into accelerator 26 following the last interaction region 50$c$ to provide for deceleration of the electrons on subsequent passes through accelerator 26.

Referring back to FIG. 1, in certain currently contemplated embodiments, accelerator 26 may further comprise an induction accelerator which may be a linear induction accelerator, a circular induction accelerator, or the like, or a combination thereof. As is known in the FEL arts, an induction accelerator allows for generation of a pulsed relativistic electron beam 42.

In other contemplated embodiments, accelerator 26 may further comprise a high voltage DC accelerator, in which the required voltage is generated by a Van de Graaf generator, a Cockroft-Walton generator, a resonant transformer, or the like, or a combination thereof.

In other currently envisioned embodiments, accelerator 26 may be comprise a linear microwave accelerator, a recirculating linear microwave accelerator, or the like, or a combination thereof. For these accelerators 26, relativistic electron beam 42 produced is a bunched relativistic electron beam 42. As is also known in the art, where accelerator 26 comprises a microwave linear accelerator disposed proximate to relativistic electron beam 22, accelerator 26 may be capable of accelerating electrons to full energy in either a single pass through the microwave linear accelerator, a series of multiple passes through the microwave linear accelerator, or a combination thereof.

In certain contemplated embodiments, the residual kinetic energy of relativistic electron beam 42 emerging from a last interaction region 50, e.g. 50$b$, is extracted as microwave energy by injecting the spent electrons into a microwave accelerator 26 at a phase at which the microwave field acts to decelerate the electrons. The energy extracted as microwave power can either be absorbed as heat in a resistive microwave load, or coupled to electron beam generator 20 to reduce the microwave power required for operation of electron beam generator 20.

In certain embodiments, microwave accelerator 26 is used to decelerate relativistic electron beam 42 and may be an accelerator 26 operated independently from electron beam generator 20.

In certain other embodiments, microwave accelerator cavity 72 (FIG. 2) may be used to accelerate the electrons in electron beam generator 20. In these embodiments, the microwave accelerator cavity 27 can also be used to decelerate spent electrons such as by adjusting the phase at which the spent electrons are injected into the cavity.

In other contemplated embodiments of the invention, the residual kinetic energy of relativistic electron beam 42 emerging from the last interaction region, e.g. 50$b$, is extracted as DC or pulsed electrical power by decelerating the electrons in a static or pulsed electric field produced by a Van de Graaf or Cockroft-Walton generator, a high voltage resonant transformer, or a pulsed high voltage transformer. The high voltage generator used to decelerate the spent electrons can either be the same generator used in electron beam generator 20 in the case of DC or induction accelerators 26, or a generator specifically constructed for the purpose and independent of electron beam generator 20. The electrical energy extracted from the spent electrons is available to reduce the net power required for acceleration of the electrons in electron beam generator 20.

Electric field generator 29 may be disposed about cathode 22 to enhance the emitted thermionic current density of thermionic cathode 22 and accelerating electrons to energies greater than 500 keV. For photoelectric cathode 22, electric field generator 29 may be disposed about cathode 22 to enhance the emitted photoelectric current density. In a preferred embodiment having electric field generator 29, an electric field generated will be at least 10 megavolts/meter with a preferred range of 100 to 150 megavolts/meter.

The electric field required for operation of the cathode may be generated by a DC potential gradient, by a pulsed potential gradient generated by a pulsed high voltage transformer, by the oscillating microwave field in a microwave cavity, or by a combination thereof. The spatial dependence of the electric field required for operation of the cathode in each possible embodiment of the invention must be controlled by shaping the contour of the cathode and the nearby conducting surfaces to minimize electron beam emittance as has been established in the prior art.

Electron beam transport system 41 may be defined within a single area or within multiple areas of FEL 10. In FIG. 1, electron beam transport system 41 is illustrated as multiple electron beam transport systems 41, i.e. electron beam transport system 41$a$ which extends from electron beam generator 20 to first magnetic field generator 52$a$, electron beam transport system 41$b$ which extends between magnetic field generators 52$a$ and 52$b$, and electron beam transport system 41$c$ which extends from magnetic field generator 52$b$ to an electron beam dump or an energy recovery system, generally referred to as 23.

Figure 3B:
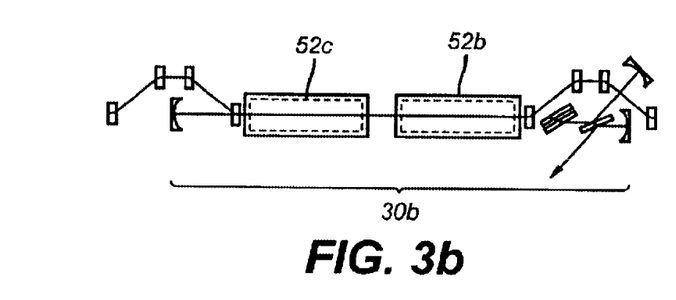
Figure 3C:
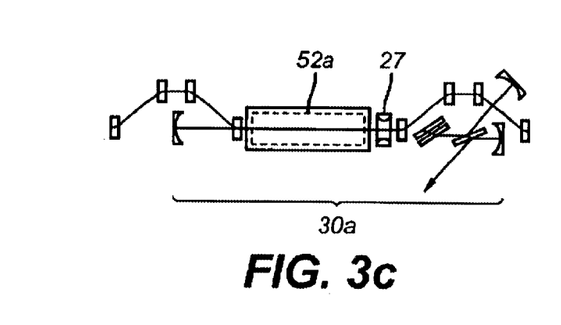

Referring now additionally to FIGS. 3$a$–3$c$, single independent magnetic field generator 52 may be disposed in a single predetermined optical cavity 30 (e.g., 30$a$ in FIG. 3$a$). A plurality of independent magnetic field generators 52 (shown as 52$b$ and 52$c$ in FIG. 3$b$) may be disposed within a single optical cavity 30 (e.g., 30$b$ in FIG. 3$b$). In other currently contemplated embodiments, a plurality of independent magnetic field generators 52 (shown as 52d, 52e, and 52f in FIG. 3c) may be disposed within a plurality of optical cavities 30 (e.g., 30c, 30d, and 30e in FIG. 3c).

Each interaction region 50 may further comprise one or more independent magnetic field generators, generally referred to by the numeral "52" and more specifically by "52a" or "52b" in FIG. 1.

Referring now to FIGS. 4a–4e, for certain embodiments in which phase displacement device 60 is incorporated into the structure of magnetic field generator 52, magnetic field generator 52 comprises a plurality of pairs of magnets 55, each magnet pair 55 having predetermined properties. Magnets 55 may be permanent magnets, electromagnets, pulsed electromagnets, pulsed iron-free electromagnets, hybrid permanent/electromagnets, or the like, or a combination thereof.

Figure 4A:
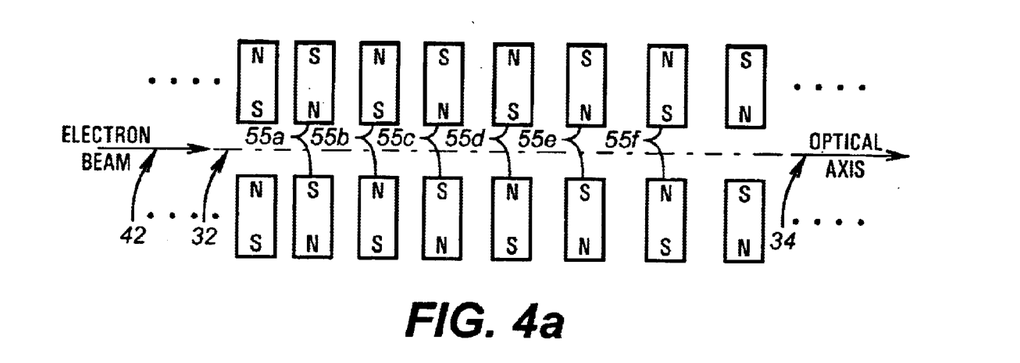
FIGS. 4a–4e are schematic views of alternative embodiments of phase displacement devices.

Each of the plurality of pairs of magnets 55 are positioned symmetrically about optical axis 34. The alternating poles of magnets 55, shown in FIGS. 4a, 4b, and 4c as "N" and "S," create a spatially oscillating magnetic field required for operation of FEL 10. Spacing of the pairs of magnets 55 along optical axis 34 may be selected to increase the period of the magnetic field with respect to position along a predetermined portion interaction region 50 such as to increase the resonant energy by a predetermined desired value (FIG. 4a). In a preferred embodiment, the increase in resonant energy attributable to the increase in period is at least twice the height of the phase-space seperatrix around which electrons drift during the interaction of the electrons with optical beam 32 and the magnetic field.

Figure 4B:
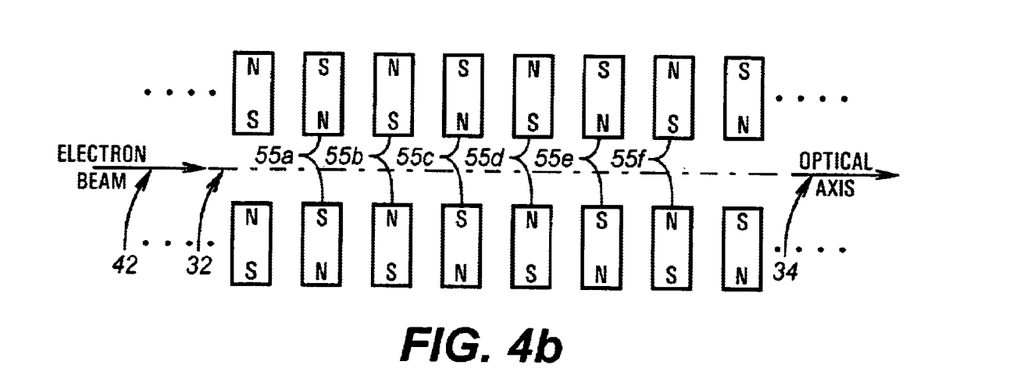
Figure 4C:
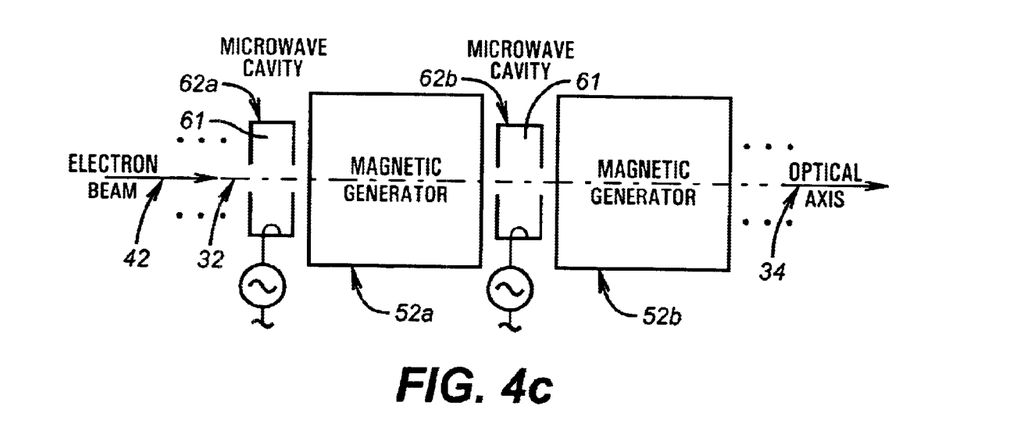
Figure 4D:
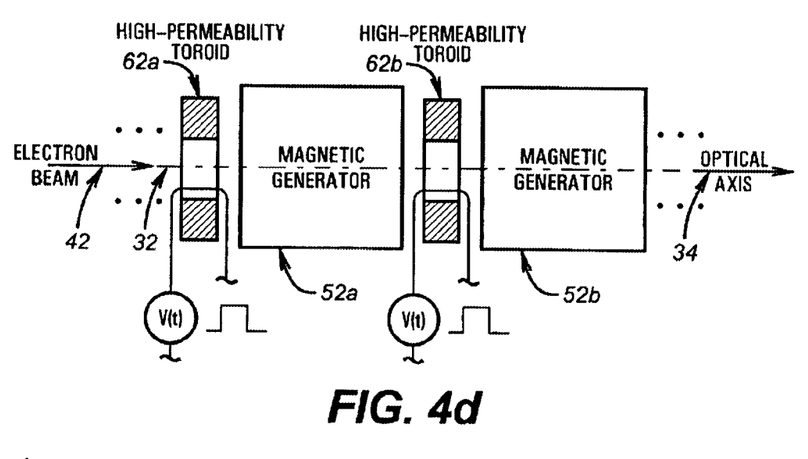
Figure 4E:
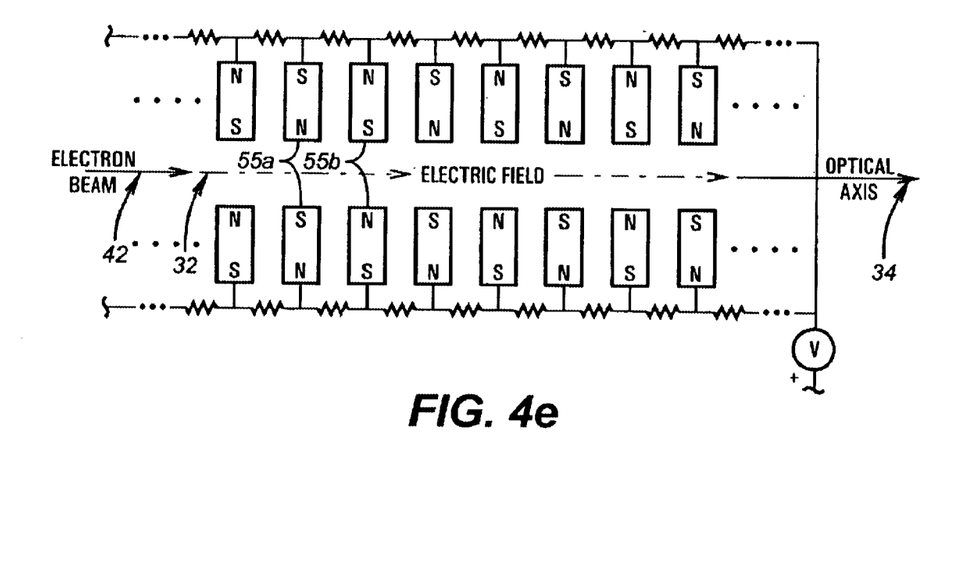

Further, the predetermined properties of magnet pairs 55 may be selected to produce a spatially oscillating magnetic field disposed about optical axis 34 whose field amplitude increases monotonically with position along an interaction region to increase the resonant energy (FIG. 4b). The predetermined properties of magnet pairs 55a, 55b, etc., comprise physical dimensions of each magnet 55, the magnetization, and periodicity. By way of example and not limitation, although shown arranged linearly in the plane with alternating poles, other arrangements are possible, such as the use of a helically wound bifilar electromagnet.

In alternative embodiments, phase displacement device 60 may induce phase displacement by using a decelerating electric field generated by one or more microwave cavities 61 disposed within the interaction region 50 (FIG. 4c), using one or more induction coils 62 disposed within the interaction region 50 (FIG. 4d), using a longitudinal electric field produced along optical axis 34 by imposing a potential gradient along the boundaries of the interaction region (FIG. 4e), or the like, or a combination thereof.

In a preferred embodiment, phase displacement device 60 induces phase displacement that is varied in time between the small-signal regime of laser oscillation and the saturated regime of laser oscillation. The time variation of the phase displacement may increase the magnitude of phase displacement from a predetermined first value to a predetermined second value.

In some embodiments, phase displacement device 60 induces phase displacement that is varied in time between the initiation of laser operation at turn-on in the small signal regime and the large signal regime characteristic of gain saturation at high power. The time variation of phase displacement may increase the magnitude of phase displacement from a predetermined first value to a predetermined second value to improve the small signal gain while retaining the phase displacement required for efficient operation in the strong signal regime at high power.

In certain alternate embodiments of the invention, the time variation of the phase displacement induced by phase displacement generator 60 may be determined by a feedback or feedforward control system to compensate for unavoidable variations in electron beam energy, current, bunch length bunch profile and optical cavity reflective and dissipative losses.

Figure 5:
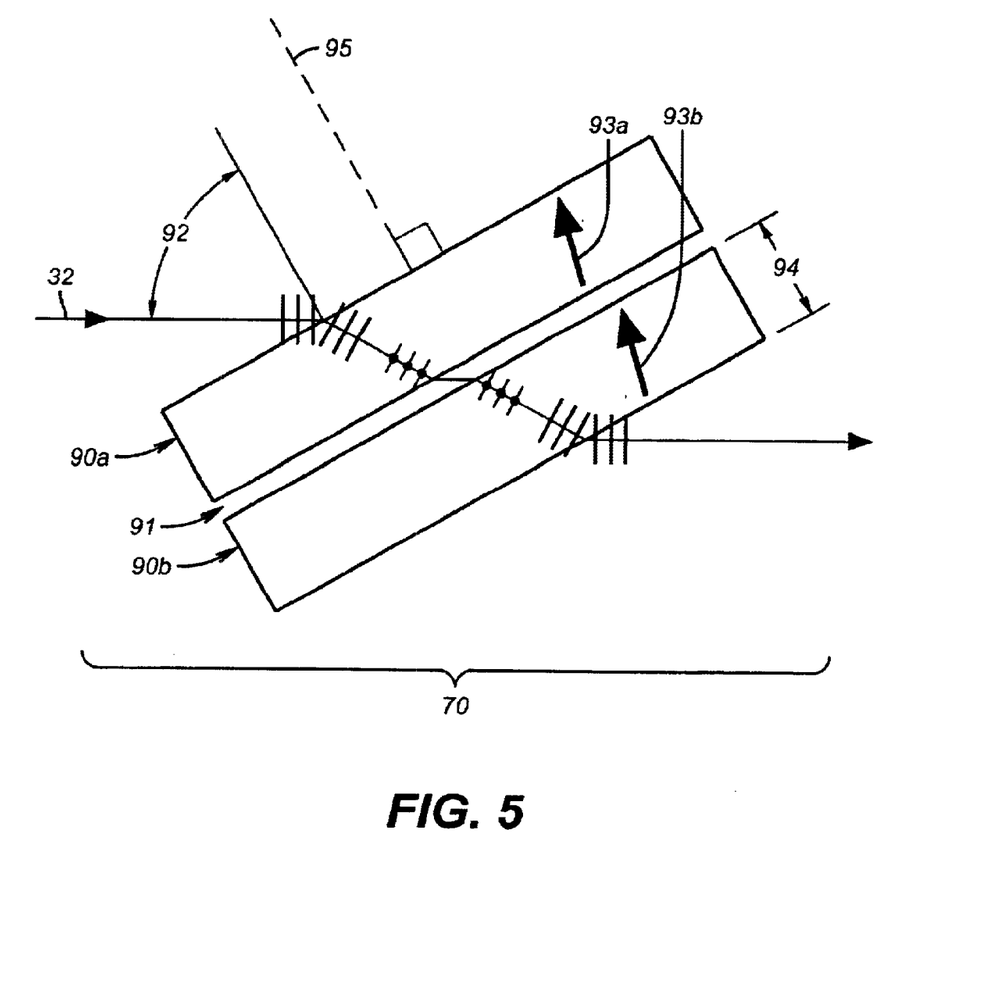
FIG. 5 is a schematic view of a preferred embodiment of an optical beam spectral filter.

Referring back to FIG. 1 and additionally to FIG. 5, in certain embodiments, optical beam spectral filter 70 is capable of altering the amplitude and phase of the spectral components of co-propagating optical beam 32 and may comprise an intracavity etalon, a diffraction grating, a dispersive device, or the like, or a combination thereof.

In certain embodiments, optical beam spectral filter 70 comprises an optical filter whose transfer function is designed to reject or attenuate optical frequencies outside of a predetermined band of frequencies. In other contemplated embodiments, optical beam spectral filter 70 comprises an optical filter whose group velocity dispersion is designed spoil cavity synchronism outside of a predetermined band of frequencies.

In a certain contemplated embodiment of optical filter 70, the optical filter comprises two parallel, uncoated birefringent crystals 90a,90b enclosing a variable-space vacuum gap 91 (FIG. 5). The primary filter function is provided by vacuum gap 91 which forms a Fabry-Perot etalon, and the birefringent crystals 90a,90b are employed to provide additional spectral selectivity by altering the reflectance of either the resonant or off-resonant wavelengths in vacuum gap 91. The characteristics of this embodiment of the optical filter include angle of incidence 92 with respect to optical beam 32 (which angle equals the Brewster angle in the preferred embodiment), the size of vacuum gap 91, the direction of crystal c-axis 93a,93b, and crystal thickness 94. In a preferred embodiment, these characteristics are chosen so that the birefringent passband for each birefringent crystal 90 is equal to the passband of vacuum gap 91.

In a currently envisioned embodiment, the passband of vacuum gap 91 is chosen to appropriately suppress the spectral components which mediate the coupled electron-optical beam instability that can disrupt the operation of FEL 10.

As depicted in FIG. 5, optical filter 70 may be rotated about surface normal 95 to vary the degree of birefringence in crystals 90, and vacuum gap 91 may be tunable using piezoelectric gap tuning.

Referring back to FIG. 1, in certain embodiments of the invention using pulsed electron beams, such as accelerated by a microwave linear accelerator, optical cavity 30 may further comprise an interferometric Michelson or Fox-Smith resonator configured to phase lock optical pulses of optical beam 32.

Output coupler 80 may further comprise a dielectric plate inclined at a predetermined angle with respect to a predetermined portion of optical beam 32, a partially transmissive optical cavity mirror, a diffraction grating, an acousto-optic grating, or the like, or a combination thereof.

The inventors have discovered that the deceleration of the electrons via the phase displacement mechanism in FEL 10 can be disrupted by an instability of the coupled relativistic electron beam 42 and generated optical field. Accordingly, in a currently preferred embodiment of the invention, optical filter 70 may be present and used to suppress this instability by limiting the growth of the spectral components of the optical field which mediate the instability.

In a second preferred embodiment, the parameters of operation may be specified to achieve free electron laser operation in a regime in which the instability is absent.

In operation of a currently preferred embodiment, FEL 10, comprising relativistic electron beam generator 20, electron beam transport system 41, magnetic field generator 52, phase displacement device 60, optical cavity 30, intracavity optical filter 70 and output coupler 80, is operated to simultaneously achieve free electron laser operation at high power, the efficient conversion of electron beam kinetic energy to light, and the uniform deceleration of the electrons moving along the streamlines in phase space between the seperatrices. In this embodiment, a center frequency of optical filter 70 may first be set at a the intended wavelength for laser operation. Bandwidth of optical filter 70 may then be set at a first predetermined value equal to or less than the synchrotron frequency. Housing 12 may optionally be part of FEL 10 as described above and may be evacuated to produce a desired vacuum.

The cavity outcoupling ratio may be set to a second predetermined value equal to the difference between the saturated gain attainable at the electron current available from electron beam generator and the reflective and dissipative and diffractive losses of optical cavity 30. Phase displacement device 60 may then be set to increase the resonant energy relative to the electron beam energy over the length of interaction region 50 by a third predetermined value at least equal to twice the height of the seperatrix attributable to laser operation at the value of optical power the system has been designed to operate.

The energy of relativistic electron beam 42 provided by electron beam generator 20 and electron beam transport system 41 may be set at a fourth predetermined value above the resonant energy at the entrance to the interaction region 50 and differing from the resonant energy by the height of the seperatrix attributable to laser operation at the value of optical power the system has been designed to operate.

In a preferred embodiment, relativistic electron beam 42 is then be left on for a time sufficient for the optical power in the cavity to grow from the small signal to the saturated regime, and for the additional period of time for which the FEL 10 must supply laser power in the application it has been designed to serve.

Exemplary operating parameters for operation of the currently preferred embodiment of FEL 10 are listed in Table 1.

TABLE 1

Specifications for the currently preferred embodiment of the invention.

| Parameter | Definition | Specification |
| --- | --- | --- |
| Optical beam parameters | | |
| $\lambda$ | Optical wavelength | 1 µm |
| $\delta_c$ | Total cavity losses | 5% |
| $Z_R$ | Rayleigh range | 40 cm |
| $P_{peak}$ | Micropulse peak laser power | 97 MW |
| $P_{ave}$ | Macropulse average laser power | 270 kW |
| Electron beam parameters | | |
| | thermionic cathode microwave gun rf linac | |
| $\gamma$ | Electron beam energy/mc² | 162.48 |
| $\tau_p$ | Bunch length | 1 ps |

TABLE 1-continued

Specifications for the currently preferred embodiment of the invention.

| Parameter | Definition | Specification |
| --- | --- | --- |
| $Q_b$ | Bunch charge | 75 pC |
| $I_{peak}$ | Micropulse peak current | 75 A |
| $\beta_x$ | Horizontal beta function | 40 cm |
| $\beta_y$ | Vertical beta function | 57 cm |
| $\epsilon_x$ | Horizontal normalized emittance | 10•mm•mrad |
| $\epsilon_y$ | Vertical normalized emittance | 5•mm•mrad |
| $T_e$ | Gun repetition rate | 2.856 GHz |
| $\tau_\Omega$ | Macropulse duration | 4.2 µs |
| Wiggler parameters | | |
| $\lambda_w$ | Wiggler magnet period | 2.4 cm (fixed period) |
| $N_w$ | Number of wiggler periods | 83 |
| $L_w$ | Wiggler length | 1.992 m |
| $\hat{K}^2$ | RMS vector potential squared | 1.2 (at entrance) |
| Field taper | Linear increase of resonant energy | 2.9 MeV |

In a further preferred embodiment, FEL 10 may comprise relativistic electron beam generator 20, optical cavity 30, interaction region 50, magnetic field generator 52, phase displacement device 60, and output coupler 80 as described herein above. Housing 12 may optionally be part of FEL 10. However, in this embodiment, optical filter 70 is not present. Instead, in this embodiment, laser parameters, including but not limited to peak current and/or output coupling, may be chosen to suppress the growth of the coupled electron-optical beam instability.

FEL 10 may be operated by setting the cavity outcoupling ratio to a first predetermined value such that the total cavity losses are large enough to prevent the growth of the spectral components which mediate the coupled electron-optical beam instability that can disrupt the operation of FEL 10. Phase displacement device 60 may then be adjusted to increase the resonant energy relative to the electron beam energy by a second predetermined value. This second predetermined value may be selected to be a value that is at least twice the height of the seperatrix formed in the course of laser operation at the value of optical power the system has been designed to operate.

The energy of electron beam 42 in this embodiment is set to a third predetermined value which is greater than the resonant energy at the start of the interaction by an amount at least equal to the height of the separatrix formed in the course of laser operation at the value of laser power at which FEL 10 has been designed to operate.

Conditions for regenerative amplification, an initial extraction of energy from the electrons in electron beam 42, and a build-up of optical power within optical cavity 30 may then be established by setting the electron beam current initially to a value sufficient to insure that the small signal laser gain exceeds the sum of the reflective, dissipative, diffractive, and outcoupling losses in optical cavity 30.

Electron beam 42 is maintained at this current for a period of time sufficient for the optical power in optical cavity 30 to grow from the small signal to the saturated regime. The saturated gain may be adjusted by changing the electron beam current provided by electron beam generator 20 to maintain a saturated gain equal to the sum of the cavity outcoupling fraction and the reflective and dissipative and diffractive cavity losses at the specified value of laser output power. Relativistic electron beam 42 may then be left on for the additional period of time for which the FEL 10 must supply laser power in the application it has been designed to serve.

Exemplary operating parameters for operation of this alternate embodiment of FEL 10 are listed in Table 2.

TABLE 2

Specifications for the second preferred embodiment of the invention.

| Parameter | Definition | Specification |
|---|---|---|
| Optical beam parameters | | |
| $\lambda$ | Optical wavelength | 1 µm |
| $\delta_c$ | Total cavity losses | 5% |
| $Z_R$ | Rayleigh range | 40 cm |
| $P_{peak}$ | Micropulse peak laser power | 26 MW |
| $P_{ave}$ | Macropulse average laser power | 220 kW |
| Electron beam parameters | | |
| | thermionic cathode microwave gun rf linac | |
| $\gamma$ | Electron beam energy/$mc^2$ | 162.48 |
| $\tau_p$ | Bunch length | 3 ps |
| $Q_b$ | Bunch charge | 75 pC |
| $I_{peak}$ | Micropulse peak current | 25 A |
| $\beta_x$ | Horizontal beta function | 40 cm |
| $\beta_y$ | Vertical beta function | 57 cm |
| $\epsilon_x$ | Horizontal normalized emittance | 10·mm·mrad |
| $\epsilon_y$ | Vertical normalized emittance | 5·mm·mrad |
| $T_e$ | Gun repetition rate | 2.856 GHz |
| $\tau_\Omega$ | Macropulse duration | 4.2 µs |
| Wiggler parameters | | |
| $\lambda_W$ | Wiggler magnet period | 2.4 cm (fixed period) |
| $N_W$ | Number of wiggler periods | 83 |
| $L_W$ | Wiggler length | 1.992 m |
| $K^2$ | RMS vector potential squared | 1.2 (at entrance) |
| Field taper | Linear increase of resonant energy | 2.9 MeV |

FEL 10 may be operated in a multicolor phase displacement mode. In this mode, FEL 10 further comprises two or more independent magnetic field generators 52 in a single optical cavity 30 (FIG. 3a); two or more independent optical cavities 30 (each with one or more independent magnetic field generators 52) using a common electron beam generator 20 (FIGS. 3b, 3c); or two or more independent optical cavities 30 (each with one or more independent magnetic field generators 52) using a common recirculating electron beam generator 20 (FIG. 2).

In an alternate multicolor embodiment, the energy of electron beam 42 may be modulated using a single subharmonic energy-shifting cavity 27 with a single magnetic field generator 52 and optical cavity 30.

FEL 10 may also be operated in an energy recovery phase displacement mode using an in-line decelerating system (DC, induction, or microwave) distinct from electron beam generator 20 and/or energy recovery using recirculation through a common set of accelerating/decelerating microwave cavities in electron beam generator 20.

While the present invention has been described above in terms of specific examples, it is to be understood that the invention is not intended to be confined or limited to the examples disclosed herein. On the contrary, the present invention is intended to cover various structures and modifications thereof included within the spirit and scope of the appended claims.

We claim:

1. A free-electron laser (FEL) comprising:
   a. a relativistic electron beam generator further comprising a cathode and an accelerator;
   b. an optical cavity adapted to store a co-propagating optical beam in which an axis of a relativistic electron beam generated at least in part by the relativistic electron beam generator is aligned along an optical axis of the optical cavity;
   c. an interaction region disposed in the optical cavity at least partially about the optical axis, the interaction region further comprising a magnetic field generator;
   d. a phase displacement device disposed about a predetermined portion of the interaction region at least partially about the optical axis;
   e. an optical beam spectral filter interposed in the optical cavity along a predetermined portion of the optical axis; and
   f. an output coupler interposed in the optical cavity in communication with a co-propagating optical beam coincident with the optical axis;
   g. wherein a predetermined portion of a co-propagating optical beam exits the optical cavity via the output coupler to produce a coherent output optical beam.

2. The FEL of claim 1 further comprising a housing maintaining a vacuum wherein the housing is capable of sustaining a vacuum pressure of at least $10^{-6}$ Torr.

3. The FEL of claim 1 further comprising a plurality of interaction regions, each interaction region further comprising at least one independent wiggler disposed in a single predetermined optical cavity.

4. The FEL of claim 1 wherein the magnetic field generator further comprises a phase displacement device.

5. The FEL of claim 4 wherein the phase displacement device induces phase displacement by using an inverse-taper of a magnetic field generated by the magnetic field generator.

6. The FEL of claim 1 wherein phase displacement device induces phase displacement that is varied in time between a small-signal regime of laser oscillation and a saturated regime of laser oscillation.

7. The FEL of claim 6 wherein the time variation of the phase displacement increases the magnitude of phase displacement from a predetermined first value to a predetermined second value.

8. The FEL of claim 1 wherein the optical beam spectral filter is capable of narrowing an envelope of an optical spectrum of the co-propagating optical beam and further comprises at least one of an intracavity etalon, a diffraction grating, or a dispersive device.

9. The FEL of claim 1 wherein the optical beam spectral filter is capable of suppressing an axial cavity mode of an optical spectrum of the co-propagating optical beam and further comprises at least one of an intracavity Michelson-mirror interferometer or an intracavity Fox-Smith interferometer.

10. The FEL of claim 1, wherein the magnetic field generator further comprises a plurality of pairs of magnets having predetermined properties, each of the plurality of pairs of magnets positioned symmetrically about the optical axis of the optical cavity wherein a periodic magnetic field required for FEL operation is generated by the plurality of pairs of magnets.

11. The FEL of claim 10 wherein a spacing of the pair of magnets along the optical axis of the optical cavity is selected to increase the period of the magnetic filed monotonically with a position along a predetermined interaction region to increase resonant energy by a value at least twice the height of the phase-space seperatrix around which electrons drift during the interaction of the electrons with the optical beam and the magnetic field.

12. The FEL of claim 1 wherein the output coupler further comprises at least one of:
   a. a dielectric plate inclined at a predetermined angle with respect to the predetermined portion of the optical beam;
   b. a partially transmissive optical cavity mirror;
   c. a diffraction grating; or
   d. an acousto-optic grating.

13. A free-electron laser (FEL) comprising:
   a. a relativistic electron beam generator;
   b. an optical cavity adapted to store a co-propagating optical beam in which an axis of a relativistic electron beam generated at least in part by the relativistic electron beam generator is aligned along an optical axis of the optical cavity;
   c. an interaction region disposed in the optical cavity, the interaction region further comprising a magnetic field generator;
   d. a phase displacement device disposed about a predetermined portion of the interaction region, and
   e. an output coupler interposed in the optical cavity to induce a predetermined value of round-trip cavity losses;
   f. wherein
      i. cavity losses at saturation are limited to a predetermined value sufficient to allow uniform deceleration of electrons along the streamlines between the separatrices; and
      ii. round-trip cavity losses at saturation have a magnitude sufficient to prevent development of coupled electron-optical beam instability.

14. A method of operating a general phase-displacement FEL oscillator, for an FEL comprising a relativistic electron beam generator, an electron beam transport system, a magnetic field generator, a phase displacement device, an optical cavity, and an output coupler, the method comprising:
   a. setting a cavity outcoupling ratio to a first predetermined value;
   b. adjusting the phase displacement device to increase the resonant energy relative to the electron beam energy by a second predetermined value;
   c. creating the electron beam;
   d. accelerating the electron beam in the relativistic electron beam generator;
   e. directing the accelerated electron beam to the interaction region by the electron beam transport system;
   f. injecting the directed electron beam into the interaction region by the electron beam transport system;
   g. setting the electron beam energy to establish the energy of the electrons provided by the electron beam generator and electron beam transport system at a third predetermined value;
   h. establishing conditions for regenerative amplification, an initial extraction of energy from the electrons in the beam, and a build-up of optical power within the optical cavity by setting the electron beam current initially to a value sufficient to insure that the small signal laser gain exceeds the sum of the optical cavity reflective, dissipative, and outcoupling losses;
   i. leaving the electron beam on for a period of time sufficient for the optical power in the cavity to grow from the small signal to the saturated regime;
   j. configurably adjusting the large signal laser gain by changing the electron beam current provided by the electron beam generator to maintain the large signal gain at a fourth predetermined value
   k. whereby laser operation at high power, efficient conversion of electron beam energy to light, and uniform deceleration of all the electrons in the electron beam are achieved simultaneously.

15. The method of claim 14 wherein the second predetermined value in step (b) is at least twice the height of the seperatrix formed in the course of laser operation at the value of optical power the system has been designed to operate.

16. The method of claim 14 wherein the third predetermined value of step (g) is below the resonant energy at the specified operating wavelength and differing from the resonant energy by the height of the seperatrix formed in the course of laser operation at the value of laser power the system has been designed to operate.

17. The method of claim 14 wherein the fourth predetermined value of step (j) is equal to the sum of the cavity outcoupling fraction and the reflective and dissipative cavity losses at the specified value of laser power output.

* * * * *

UNITED STATES PATENT AND TRADEMARK OFFICE
CERTIFICATE OF CORRECTION

PATENT NO. : 6,636,534 B2
DATED : October 21, 2003
INVENTOR(S) : Madey et al.

It is certified that error appears in the above-identified patent and that said Letters Patent is hereby corrected as shown below:

<u>Title page,</u>
Item [75], Inventors, please delete "Crissafulli" and insert -- Crisafulli --.

Signed and Sealed this

Tenth Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO.         : 6,636,534 B2                                                     Page 1 of 1
APPLICATION NO. : 10/081577
DATED              : October 21, 2003
INVENTOR(S)        : John Madey, Eric Szarmes and Orion Crissafulli It is certified that error appears in the above-identified patent and that said Letters Patent is hereby corrected as shown below:

Column 1 Line 12, insert
-- STATEMENT REGARDING FEDERALLY SPONSORED RESEARCH OR DEVELOPMENT
This invention was made with Government support under Contract No. DASG60-99-C-0057 awarded by U.S. Army Space and Missile Defense Command/U.S. Army Forces Strategic Command. The Government has certain rights in the invention. --

Signed and Sealed this

Seventh Day of September, 2010

David J. Kappos
*Director of the United States Patent and Trademark Office*